United States Patent [19]
Cioffi

[11] Patent Number: 5,933,454
[45] Date of Patent: *Aug. 3, 1999

[54] MULTI-CARRIER DATA TRANSMISSIONS SYSTEM USING AN OVERHEAD BUS FOR SYNCHRONIZING MULTIPLE REMOTE UNITS

[75] Inventor: John M. Cioffi, Cupertino, Calif.

[73] Assignee: Amati Communications Corporation, San Jose, Calif.

[*] Notice: This patent is subject to a terminal disclaimer.

[21] Appl. No.: 08/816,839

[22] Filed: Mar. 13, 1997

Related U.S. Application Data

[63] Continuation of application No. 08/252,829, Jun. 2, 1994, Pat. No. 5,625,651.

[51] Int. Cl.$^6$ ................................ H04L 7/00; H04J 1/00
[52] U.S. Cl. .................... 375/260; 375/356; 375/371; 370/480
[58] Field of Search ...................... 375/222, 260, 375/354, 356, 358, 362, 371; 370/324, 503, 507–509, 516, 480; 455/517, 502

[56] References Cited

U.S. PATENT DOCUMENTS

| | | | |
|---|---|---|---|
| 4,256,925 | 3/1981 | Goode | 370/104 |
| 4,314,376 | 2/1982 | Williams | 455/212 |
| 4,438,511 | 3/1984 | Baran | 370/19 |
| 4,528,656 | 7/1985 | Morais | 370/30 |
| 4,601,045 | 7/1986 | Lubarsky | 375/38 |
| 4,606,023 | 8/1986 | Dragoo | 370/94.1 |
| 4,773,065 | 9/1988 | Koyobashi et al. | 370/67 |
| 4,870,408 | 9/1989 | Zdunek et al. | 370/95.1 |
| 4,914,651 | 4/1990 | Lusignan | 370/69.1 |
| 5,043,982 | 8/1991 | Werner | 370/100.1 |
| 5,072,445 | 12/1991 | Nawata | 370/104.1 |
| 5,148,272 | 9/1992 | Acampora et al. | 358/133 |

(List continued on next page.)

FOREIGN PATENT DOCUMENTS

| | | |
|---|---|---|
| 0295227A1 | 12/1988 | European Pat. Off. . |
| 0562868A2 | 9/1993 | European Pat. Off. . |
| WO85/03180 | 7/1985 | WIPO . |
| WO 92/10884 | 6/1992 | WIPO . |

OTHER PUBLICATIONS

Bingham, John A.C., "Multicarrier Modulation for Data Transmission An Idea Whose Time Has Come", IEEE Communications Magazine, May 1990.

*Primary Examiner*—Amanda Le
*Attorney, Agent, or Firm*—Beyer & Weaver, LLP

[57] ABSTRACT

A bi-directional data transmission system that facilitates communications between a central unit and a plurality of remote units using a frame based discrete multi-tone (DMT) transmission scheme is disclosed. The discrete multi-tone data transmission system has a multiplicity of discrete subchannels including an overhead bus. In a method aspect of the invention, frames transmitted from the plurality of remote units are synchronized at the central unit. When a selected remote desires to initiate communications, it loop times it own clock to the clock of the central unit and transmits a remote initiated synchronization signal to the central unit over a dedicated overhead subchannel in the overhead bus. The central unit responds with a centrally initiated synchronization signal that contains information indicative of a frame boundary phase shift required to synchronize the selected first remote unit with other remote units that are currently communicating with the central unit. The remote responds by shifting the phase of the frames it outputs by an amount indicated by the centrally initiated synchronization signal. This synchronizes the frame boundaries of the frames outputted by the selected remote unit with frame boundaries of frames output by the other remote units that are currently communicating with the central unit. The synchronization is arranged to occur such that the frame boundaries from the various remotes substantially coincide when they are received at the central unit. Specific central and remote modem designs suitable for implementing such a system are also described.

15 Claims, 7 Drawing Sheets

U.S. PATENT DOCUMENTS

| | | | |
|---|---|---|---|
| 5,177,739 | 1/1993 | Basnuevo et al. | 370/85.8 |
| 5,272,700 | 12/1993 | Hansen et al. | 370/124 |
| 5,285,474 | 2/1994 | Chow et al. | 375/13 |
| 5,291,289 | 3/1994 | Hulyalkar | 348/23 |
| 5,293,633 | 3/1994 | Robbins | 455/3.1 |
| 5,317,571 | 5/1994 | Marcel et al. | 370/103 |
| 5,440,561 | 8/1995 | Werronen | 370/105.1 |
| 5,471,473 | 11/1995 | Tejima | 370/85.7 |
| 5,557,612 | 9/1996 | Bingham | 370/71 |
| 5,625,651 | 4/1997 | Cioffi | 375/354 |
| 5,644,573 | 7/1997 | Bingham et al. | 370/503 |

MULTI-CARRIER DATA TRANSMISSIONS SYSTEM USING AN OVERHEAD BUS FOR SYNCHRONIZING MULTIPLE REMOTE UNITS

CROSS REFERENCE TO RELATED APPLICATION

The present invention is a continuation of U.S. Pat. application Ser. No. 08/252,829, filed June 2, 1994, now U.S. Pat. No. 5,625,651 issued Apr. 29, 1997, which is incorporated herein by reference in it entirety.

BACKGROUND OF THE INVENTION

The present invention relates generally to systems for the transmission and reception of high speed data signals between a central station and a plurality of remote units using a discrete multi-tone (DMT) multi-carrier approach. More particularly, the use of a dedicated overhead bus for synchronizing frames transmitted from the various remote units is described.

At the time of this writing, the Alliance For Telecommunications Information Solutions (ATIS), which is a group accredited by the ANSI (American National Standard Institute) Standard Group, is nearing finalization of a standard for the transmission of digital data over Asymmetric Digital Subscriber Lines (ADSL). The standard is intended primarily for transmitting video data over ordinary telephone lines, although it may be used in a variety of other applications as well. The standard is based on a discrete multi-tone transmission system. The pending North American Standard is referred to as the T1E1.4 ATIS Standard, and is presently set forth in Standard Contribution No. 94-007, rev. 2, dated April of 1994, which is incorporated herein in its entirety. Transmission rates are intended to facilitate the transmission of information at rates of at least 6 million bits per second (i.e., 6+ Mbps) over ordinary phones lines, including twisted-pair phone lines. The standardized discrete multi-tone (DMT) system uses 256 "tones" that are each 4.3125 kHz wide in the forward (downstream) direction. That is, in the context of a phone system, from the central office (typically owned by the telephone company) to a remote location that may be an end-user (i.e., a residence or business user).

The Asymmetric Digital Subscriber Lines standard also contemplates the use of a duplexed reverse signal at a data rate of 16–800 Kbps. That is, transmission in an upstream direction, as for example, from the remote location to the central office. Thus, the term Asymmetric Digital Subscriber Line comes from the fact that the data transmission rate is substantially higher in the forward direction than in the reverse direction. This is particularly useful in systems that are intended to transmit video programming or video conferencing information to a remote location over the telephone lines. By way of example, one potential use for the systems allows residential customers to obtain videos information such as movies over the telephone lines rather than having to rent video cassettes. Another potential use is in video conferencing.

The discrete multi-tone (DMT) transmission scheme has the potential for use in applications well beyond data transmissions over telephone lines. Indeed, DMT can be used in a variety of other digital subscriber access systems as well. For example, it may be used in cable based subscriber systems (which typically use coaxial cable) and wireless subscriber systems such as digital cellular TV. In cable systems, a single central unit (central modem) is typically used to distribute digital signals to more than one customer which means more than one remote unit (remote modem). While all of the remote modems can reliably receive the same digital signals, the upstream transmissions must be coordinated to prevent confusion at the central modem as to the source of the upstream signals. Presently, in cable systems (which do not use discrete multi-tone transmission schemes), each remote unit is given a dedicated frequency band over which it is to communicate with the central station. However, such an approach is inherently an inefficient use of transmission bandwidth and typically requires the use of analog filters to separate transmissions from the various remote units. Stationary digital cellular transmission systems face similar obstacles.

ADSL applications have the potential for a similar problem, although it is typically more limited in nature. Specifically, a single line may service a plurality of drop points at a particular billing address (which may typically be a home or an office). That is, there may be several telephone "jacks" through which the user may wish to receive signals. To facilitate service to multiple locations (jacks) over a single line, the use of a master modem has been proposed to facilitate synchronization. However, this is perceived as being a relatively expensive and undesirable solution. Accordingly, it would be desirable to provide a mechanism in discrete multi-tone data transmission systems which facilitates the synchronization of signals from a plurality of remotes so that a central unit can coordinate and reliably interpret signals sent from the remotes.

SUMMARY OF THE INVENTION

To achieve the foregoing and other objects and in accordance with the purpose of the present invention, a bi-directional data transmission system that facilitates communications between a central unit and a plurality of remote units using a frame based discrete multi-tone (DMT) transmission scheme is disclosed. The discrete multi-tone data transmission system has a multiplicity of discrete subchannels including an overhead bus. In one aspect of the invention, frames transmitted from the plurality of remote units are synchronized at the central unit. When a selected remote desires to initiate communications, it loop times its own clock with the clock of the central unit and then transmits a remote initiated synchronization signal to the central unit over a dedicated overhead subchannel in the overhead bus. The central unit responds with a centrally initiated synchronization signal that contains information indicative of a frame boundary phase shift required to better synchronize the selected first remote unit with other remote units that are currently communicating with the central unit. The remote responds by shifting the phase of the frames it outputs as indicated by the centrally initiated synchronization signal. The synchronization may be done in either an iterative manner or as a single step. This synchronizes the frame boundaries of the frames outputted by the selected remote unit with frame boundaries of frames output by the other remote units that are currently communicating with the central unit. The synchronization is arranged to occur such that the frame boundaries from the various remotes substantially coincide when they are received at the central unit.

In one embodiment of the invention the overhead bus includes two dedicated overhead subchannels and the remote initiated synchronization signal and the centrally initiated synchronization signal are transmitted over different overhead subchannels. In other embodiments a single or multiple dedicated overhead subchannels may be used. The invention has application in a wide variety of data transmission schemes including Asymmetric Digital Subscriber Line systems that includes the transmission of signals over twisted pair, fiber and/or hybrid telephone lines, cable systems that includes the transmission of signals over a coaxial cable, and digital cellular television systems that include the transmission of radio signals.

In some embodiments, the number of subchannels available to the selected remote unit for transmission of data to the central unit are dynamically allocated. Specific central and remote modem designs suitable for implementing such a system are also described.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Discrete Multi-Tone (DMT) data transmission schemes have been shown to facilitate high performance data transmission. Among the benefits of DMT architectures is that they have high spectral efficiencies and can adaptively avoid various signal distortion and noise problems. Since they have very high data transmission capabilities, in most applications selection of a DMT data transmission scheme will provide plenty of room for the expansion of service as the demands on the data transmission system increase. Discrete Multi-tone technology has applications in a variety of data transmission environments. For example, the presently proposed ATIS Asymmetric Digital Subscriber Line North American standard contemplates use of a Discrete Multi-Tone data transmission scheme.

A detailed description of the protocols for ATIS Asymmetric Digital Subscriber Line North American standard Discrete Multi-Tone transmission scheme is described in detail in the above referenced ATIS contribution, which is incorporated herein by reference in its entirety. The standardized discrete multi-tone (DMT) system in North America uses 256 "tones" which are each 4.3125 kHz wide in the forward (downstream) direction. The frequency range of the tones is from zero to 1.104 MHz. The lower 32 tones may also be used for duplexed data transmission in the upstream direction. An improvement in this system which contemplates doubling of the transmission bandwidth is described in U.S. Pat. No. 5,519,781 issued May 21, 1996, which is also incorporated herein by reference. In other systems, the number of subchannels used may be widely varied. However when IFFT modulation is done, typical values for the number of available subchannels are powers of two, as for example, 128, 256, 512, 1024 or 2048 subchannels.

As described in the background section of this application, one limitation of the discrete multi-tone transmission system is that in order to support a plurality of drop points serviced by a single line (such as occurs with the phone lines in many homes and offices), a master unit has generally been considered necessary to synchronize all of the units at that sight. This synchronization problem has limited the attractiveness of Discrete Multi-tone data transmission schemes in certain other applications such as cable systems and wireless cellular television delivery applications since these systems use a single line to service a relatively large number of independent remote units, which would typically be owned by different subscribers.

Figure 1:
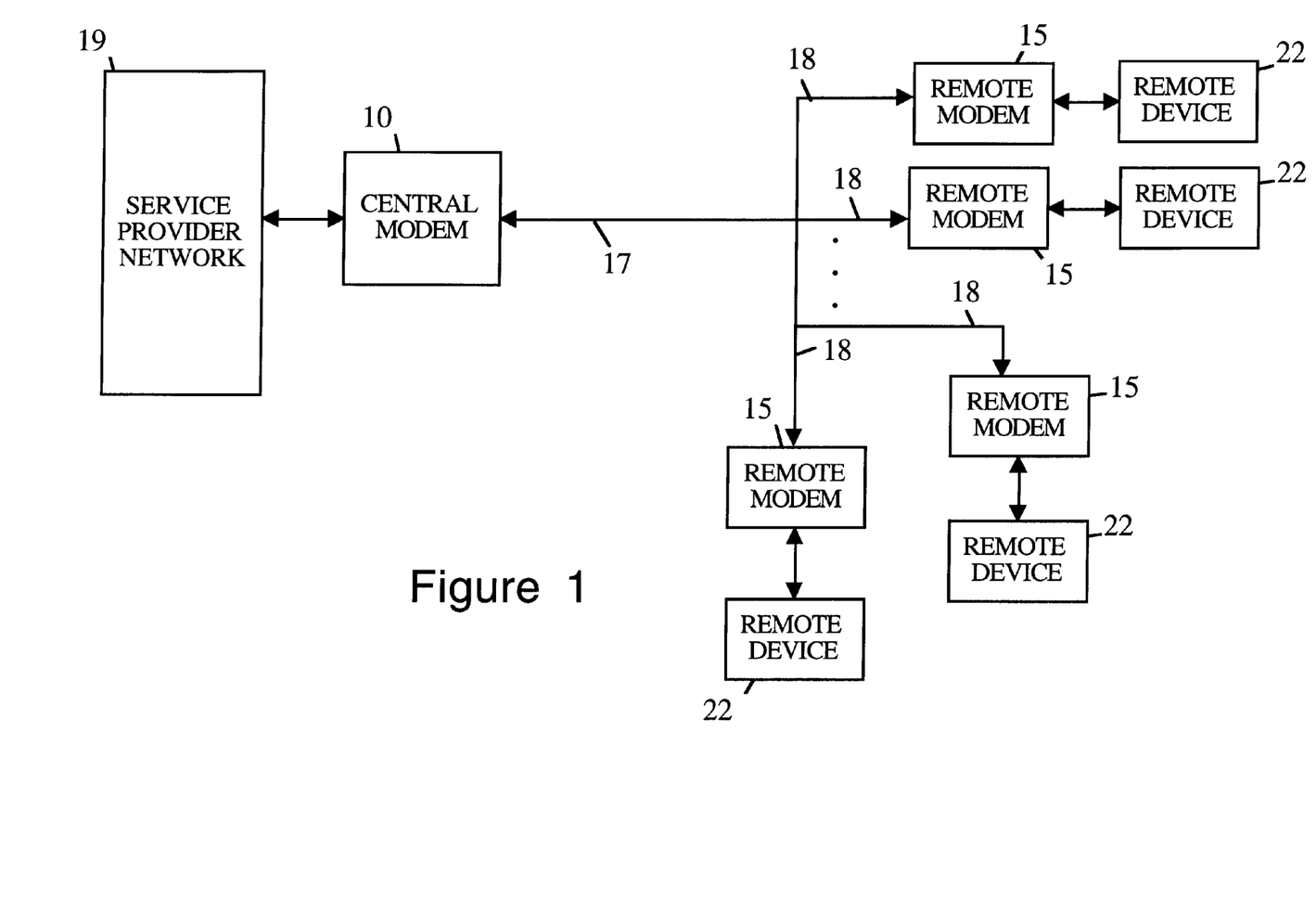
FIG. 1 is a block diagram of a data transmission scheme that uses a single transmission media to facilitate communications between a central station and a plurality of remote units.

Referring initially to FIG. 1, a schematic transmission scheme for a typical multi-user subscriber network will be described. A central unit 10 (which includes a central modem) communicates with a plurality of remote units over a common transmission line 17 which is split into a plurality of feeds 18. Each feed 18 services an associated remote unit which typically includes a remote modem 15 which receives the signals and a remote device 22 which uses the data. A service provider 19 would typically be arranged to provide the data to the central modem for transmission to the remote modems 15 and to handle the data received by the central modem from the remote modems. The service provider 19 can take any suitable form. By way of example, the service provider can take the form of a network server. The network server can take the form of a dedicated computer or a distributed system. A variety of transmission mediums can be used as the transmission line. By way of example twisted pair phone lines, coaxial cables, fiber lines and hybrids that incorporate two or more different mediums all work well. This approach also works well in wireless systems.

As will be appreciated by those skilled in the art, one requirement of discrete multi-tone data transmission systems such as those contemplated herein is that if two or more units (typically two remote units) are attempting to independently transmit information to a third unit (i.e. the central unit), the signals from the remote units must by synchronized or at least some of the signals will be incomprehensible to the central unit. The problem with using discrete multi-tone transmissions in such a system is that the length of the feeds 18 will typically vary from remote to remote. Therefore, even if the remotes synchronize with the clock of the central unit, their communications back to the central unit will be phase shifted by an amount that is dependent at least in part on the length of the associated feed. In practice, these types of phase shifts can make remotely initiated communications unintelligible to the central modem.

DMT transmission inherently partitions a transmission media into a number of subchannels that each carry data independently. The data on each subchannel can correspond to different signals or can be aggregated into higher data rates that represent a single or fewer wider-bandwidth transmissions. These subchannels are implemented entirely with digital signal processing in DMT, which eliminates the need for analog separation filters and maximizes spectral efficiency. However, the inherent multiplexing nature of DMT was previously restricted to point-to-point transmission because the different transmissions must be synchronized for the all-digital multiplexing to function properly. The present invention provides a novel arrangement and method for synchronizing a plurality of remote units, to facilitate multipoint-to-point transmission.

Figure 2:
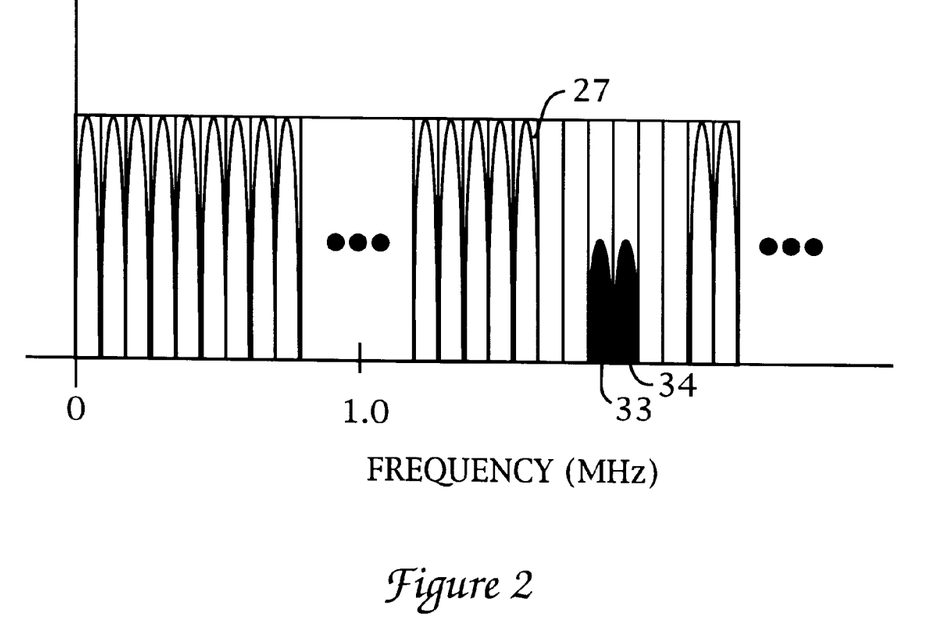
FIG. 2 is a graph illustrating a multi-tone transmission band that includes a pair of dedicated overhead subchannels.

A representative DMT transmission band is illustrated in FIG. 2. As seen therein, the transmission band includes a multiplicity of subchannels 25 over which independent carrier signals (referred to as subcarriers 27) may be transmitted. To address the synchronization problems pointed out above, the applicant has proposed the use of dedicated overhead subchannels 33 and 34 to facilitate synchronization. Upstream overhead subchannel 33 carries synchronization signals from the various remotes to the central modem. Downstream overhead subchannel 34 carries synchronization signals from the central modem to the various remotes. The overhead subchannels 33 and 34 may be located at any suitable frequency position within the transmission band. In many embodiments such as the asymmetric digital subscriber line system discussed above, it may be desirable to locate the overhead subchannels near either the upper or lower frequency edge of the downstream signal so as to minimize their interference with adjoining subchannels. When the system constraints permit, it may be further desirable to separate the overhead subchannels from other subchannels used for data transmission by at least one or two subchannels in order to minimize potential interference caused by the synchronization signals.

This is desirable since the synchronization signals will often be unsynchronized with other transmissions. Therefore, they will cause more distortion than other signals due to being out of synch. Accordingly, a small buffer is helpful. Along the same lines, it may also be desirable to use relatively low powered signals as the overhead subcarriers to further minimize interference issues in some cases.

Figure 3:
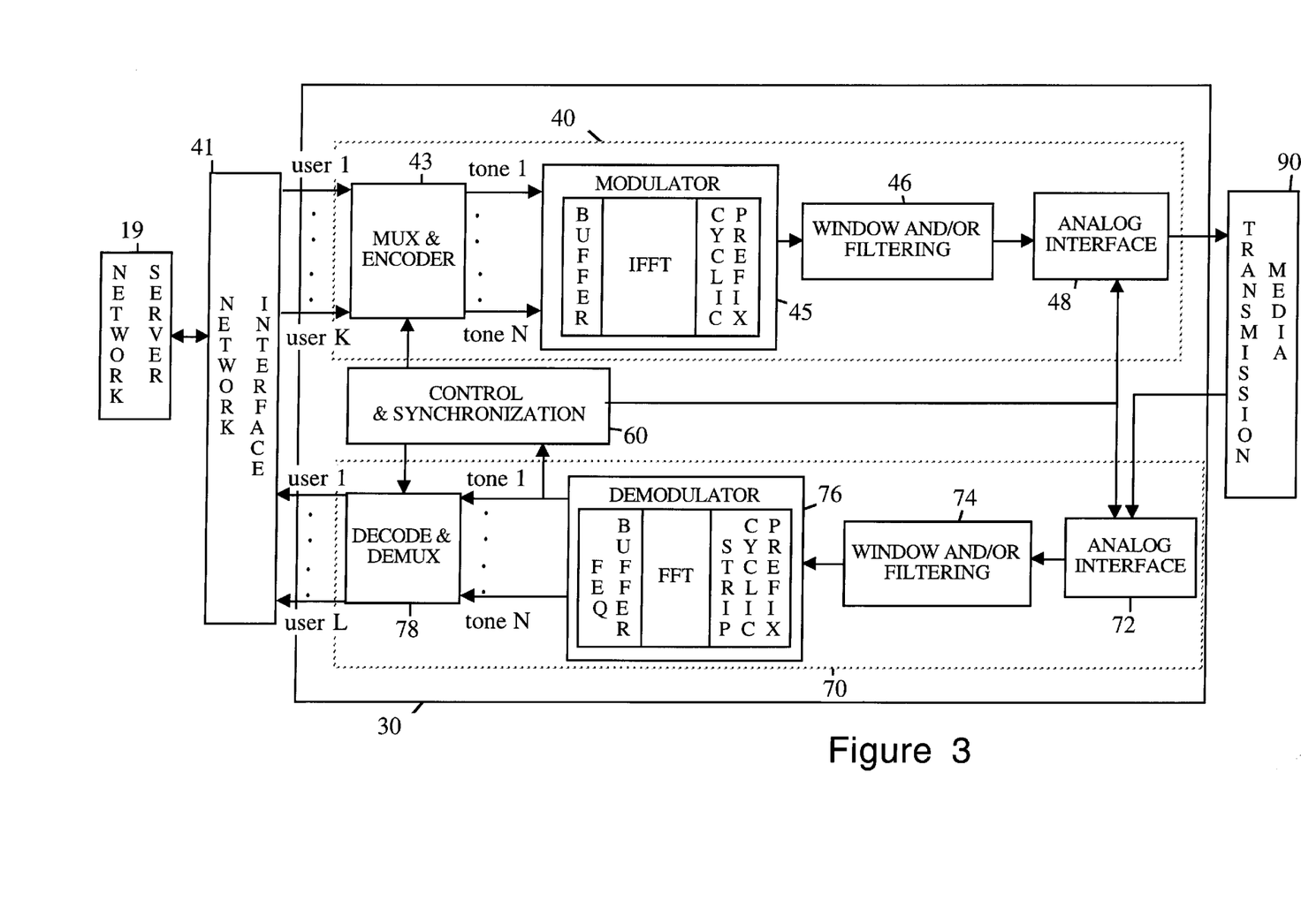
FIG. 3 is a block diagram of a central office modem architecture suitable for implementing the synchronization of the present invention.

Referring next to FIG. 3, a central office architecture suitable for implementing the synchronization of the present invention will be described. The central unit in the illustrated embodiment includes a central modem 30, a network server 19, and a network interface 41. The central modem includes a transmitter 40, a receiver 70, and a controller 60. The controller 60 is used to synchronize the clocks of the remote modems with the clock in the central modem, as well as synchronize frames transmitted from the remote modems. The network server 19 provides digital data to the transmitter 40 through an asynchronous transfer modem switch 41 (labeled network interface in the drawings). The network server 19 can provide data at any data rate up to the maximum data rate permitted in view of the transmitter's capability, the transmission distance, the transmission line quality and the type of communications line used. The transmitter 40 incorporates several components including an encoder 43, a discrete multi-tone modulator 45 and a windowing filter 46. The encoder 43 serves to multiplex, synchronize and encode the data to be transferred (such as video data). More specifically, it translates incoming bit streams into in phase, in quadrature components for each of a multiplicity of subchannels. The encoding may be done using forward error correction and/or trellis coding. The encoder would typically be arranged to output a number of subsymbol sequences that are equal to the number of subchannels available to the system. By way of example, in a system having 256 subchannels, the encoder would output 256 subsymbol sequences. In the above-referenced ATIS standard, the subsymbol sequences would each represent 4 Kbps. These inputs are complex inputs that are passed to a discrete multi-tone modulator 45. By way of example, a suitable encoder is described in detail in the referenced ATIS standard.

The modulator 45 is an IFFT modulator that computes the inverse Fourier transform by any suitable algorithm. Since the encoder outputs are complex numbers, the IFFT modulator receives twice as many inputs as there are subchannels available. The bit distribution is determined adaptively in discrete multi-tone systems as described in both the referenced ATIS standard and U.S. Pat. No. 5,479,447 issued Dec. 26, 1995. To facilitate this, the transmitter 40 also includes a line monitor that monitors the communication line to determine the line quality of each of the available subchannels. In one embodiment, the line monitor 64 (which may be part of the controller 60) determines the noise level, single gain and phase shift on each of the subchannels. The object is to estimate the signal-to-noise ratio for each of the subchannels. Therefore, other parameters could be monitored as well or in place of the parameters described. The determination of which subchannels to transmit the encoded data over as well as how much data to transmit over each subchannel is dynamically determined on the basis of several factors. The factors include the detected line quality parameters, subchannel gain parameters, a permissible power mask, and the desired maximum subcarrier bit-error rates. It is noted that the various factors need not be constant between subchannels and indeed may even vary during use. Most notably, the line quality parameters are continually checked and adjustments in the modulation scheme are made in real time to dynamically adjust the modulation as the line quality over various subchannels changes during use. By way of example, a suitable discrete multi-tone modulator is described in the same ATIS standard document.

After the encoded signal has been modulated to form a discrete multi-tone signal, a cyclic prefix is appended to the discrete multi-tone encoded signal. The cyclic prefix is used primarily to simplify the demodulation of the discrete multi-tone signals. In the ATIS standard, a 32-bit cyclic prefix is used. However, in systems that utilize larger bandwidths, it would be preferable to increase the length of the cyclic prefix as well. The modulated signal is then passed through a windowing filter 46 and/or other filters in order to minimize the out of band energy. This is desirable to help prevent the analog interfaces in the remote receivers from saturating. The windowing can be accomplished by a wide variety of conventional windowing protocols. The transmitter also includes an analog interface 48 which applies the discrete multi-tone signal to the transmission media. In hardwired systems such as twisted pair phone lines and coaxial cables, the analog interface may take the form of a line driver.

The central modem 30 also includes a receiver 70 for receiving multi-tone signals from the remote units. The receiver 70 includes an analog interface 72, a windowing filter 74, a demodulator 76, and a decoder 78. Signals received by the central modem 30 are initially received through the analog interface 72. The windowing filter 74 is arranged to effectively perform windowing and/or filtering functions on the received signal. One suitable filter arrangement is a time domain equalizer 74. Again, the windowing can be accomplished by a wide variety of conventional windowing protocols. The demodulator 76 demodulates the equalized discrete multi-tone signal and strips the cyclic prefix. The decoder 78 decodes the demodulated signal. The demodulator 76 and the decoder 78 effectively perform inverse functions of the modulator 45 and encoder 43, respectively. The decoded signal is then passed from the decoder 78 to the networks server 19 or other appropriate user of the information through the interface 41. The functions of the time domain equalizer 74, the demodulator 76 and the decoder 78, as well as algorithms suitable for accomplishing the desired functions are all described in more detail in Chow et al.'s U.S. Pat. No. 5,285,474 which are incorporated herein by reference.

Figure 4:
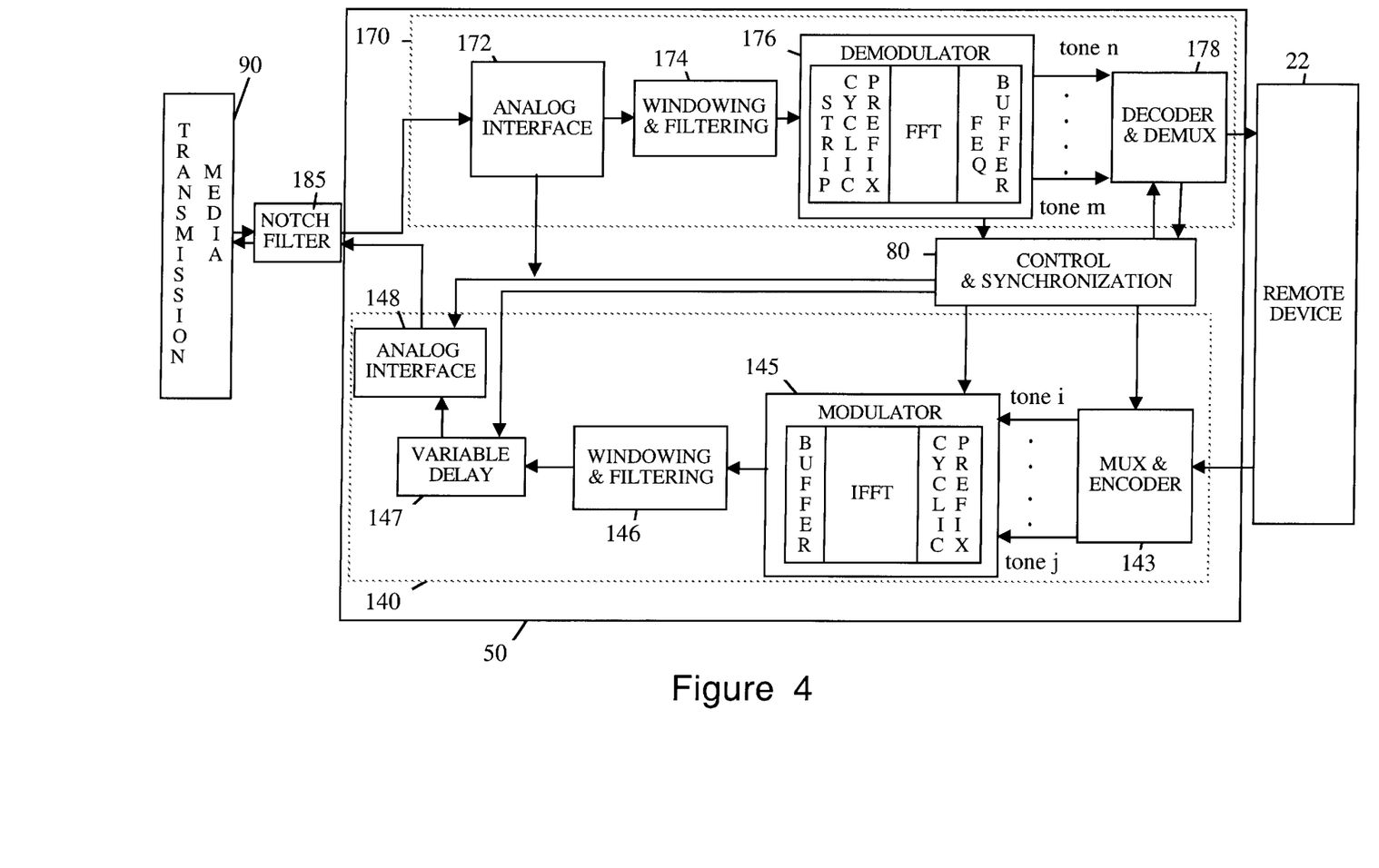
FIG. 4 is a block diagram of a remote unit modem architecture suitable for implementing the synchronization of the present invention.

Referring next to FIG. 4, a remote unit architecture suitable for implementing the synchronization of the present invention will be described. In many respects the remote modem will be similar to the central modem although its respective upstream and downstream communications capacities may be somewhat different. A signal transmitted by the central modem 30 is received by a remote unit 50 through an analog interface 172. The remote unit 50 includes the analog interface 172, a time domain equalizer (TEQ) 174, a demodulator 176 that demodulates the equalized discrete multi-tone signal and strips the cyclic prefix, and a decoder 178 that decodes the demodulated signal. The time domain equalizer 174 effectively performs a filtering functions on the received signal. A windowing filter may also be employed. The demodulator 176 and the decoder 178 perform inverse functions of the modulator 45 and encoder 43, respectively. The decoded signal is then passed from the decoder 178 to a remote device 22 such as a television, a computer, or other suitable receiving apparatus. The function of the time domain equalizer 174, the demodulator 176 and the decoder 178, are similar to the functions of the corresponding components in the central modem. A notch filter 185 may optionally be provided at a location upstream of the receiver's analog interface 172 in order to block energy in frequency bands outside of the subchannels that are of interest to the remote unit. This can help prevent the analog filter from saturating. By providing a notch analog or other suitable filtering mechanism for filtering out of band energy, lower cost receiver components can be used since it is not necessary for the receiver itself to handle as much energy.

The upstream encoding and modulation may be done in exactly the same manner as the downstream data transmission described above in the discussion of the central modem unit. Thus, the remote modem 50 will also include an encoder 143, a multi-tone modulator 145, a window or filter 146, and an analog interface 148. It also requires a frame synchronizer 147 to time delay the multi-tone signals an amount suitable to synchronize the remote modem 50 with other remotes that are currently in communication with the central modem as will be described in more detail below. In subscriber type applications, a smaller number of subchannels are typically made available to facilitate upstream communications. However, it should be appreciated that any number of subchannels could be made available for such upstream communications.

The remote modem 50 also includes a remote synchronization controller 80 that cooperates with the central controller 60 in the central modem unit. As briefly discussed above, in the described embodiment, two auxiliary overhead subchannels are provided to facilitate communications between the controllers. When the remote modem 50 is initialized and desires to come on stream, its remote controller 80 observes downstream signal transmissions that inherently contain the central modem clock information. This is sometimes done by employing pilot signals although other schemes can be employed as well. The remote modem is then "loop-timed". That is, it phase locks its own clock with the clock of the central modem. The remote controller then sends a synchronization signal to the central unit 30 via overhead subchannel 33. The synchronization signal passes through the transmission media into the receiver portion of central modem unit 30. When the central modem 30 receives a remotely initiated (upstream) synchronization signal while it is currently in communication with other remote units, it compares the frame boundaries of the remotely initiated synchronization signal with the frame boundaries of signals being received from other remote units. Typically, there would be a phase shift between the frame boundaries that is detected by the controller 60. The controller 60 then generates a downstream synchronization signal that is transmitted back to the remote units via overhead subchannel 34.

In the embodiment described and shown, the controller 80 is responsible for generating the upstream synchronization signal when the remote modem desires to initiate communications with the central modem. The upstream synchronization signal is fed from the controller 80 to the multiplexer/encoder 143 and directed specifically towards upstream overhead subchannel 33. It should be appreciated that since the nature of the synchronization signal is known, it could be introduced to the transmitter at other locations as well or could even be applied directly to the analog interface 148. Typically, the synchronization signals and/or sequence would be the only signals transmitted by the remote until synchronization is complete. The upstream synchronization signal is then transmitted to the central modem via overhead subchannel 33 where it would be received by receiver 70. The receiver's demodulator 76 then feeds the demodulated synchronization signal to the central modem's controller 60. The central controller 60 detects the remotely initiated synchronization signal and compares its frame boundary to the frame boundaries of any signals that are simultaneously being received from other remote units. When the central modem 30 is in communication with other remotes, it is likely that the frame boundaries of the remote requesting access will be phase shifted from the frame boundaries of those that are already in communication with the central modem due to variations in the feed length. In such cases, the central controller 60 initiates a return (downstream) synchronization signal that indicates the phase shift (which takes the form of a time delay) required to align the frame boundaries. The return synchronization signal is then transmitted to the remotes via the second overhead subchannel 34. Like the upstream synchronization signal, the downstream synchronization signal may be introduced to the downstream data stream at the encoder.

The nature of the downstream synchronization signal may vary, however, by way of example, the synchronization signal may simply indicate that the remote should advance or retard the frame boundary by one sample. In a somewhat more complicated system, the controller can attempt to calculate the number of samples that the frame boundary must be advanced or retarded and a signal that dictates the number of samples that the frame boundary should be shifted can be sent. Other signal interpretations can be used as well. As will be discussed in more detail below, in many embodiments, the sample rate for upstream communications will be an integer factor of the sample rate of the downstream communications. The described delay is based on the sample rate of the central modem, as opposed to the remote.

Since a plurality of remotes are all connected to the same transmission line 17, the synchronization signal will be received by all the operating remote modems. The signal are then passed from each remote modem's decoder to their associated controller 80. However, the remote controllers 80 are arranged to ignore synchronization signal on the overhead subchannel unless they are currently trying to initiate communications with the central modem. This can be accomplished in a variety of ways. By way of example, the downstream synchronization signals may include an address directed at a specific remote. Alternatively, the remotes can simply assume that the central modem signal is directed at them if they are currently attempting to initiate communications. The remote controller 80 of the remote unit that is attempting to initiate communications receives and interprets the centrally initiated synchronization signal and instructs the frame synchronizer 147 to implement the requested phase shift timing delay (or advance). A second remotely initiated synchronization signal would then be sent. If the new synchronization signal is not in synch, the same process will be repeated. In one embodiment, the synchronization signal would merely instruct the frame synchronizer to advance or retard by one sample. It is contemplated that in most applications of DMT, such an incremental system will work well to quickly synchronize the remote unit. By way of example, in a system that has a symbol (frame) rate of 8 kHz (and thus a symbol period of 125 μs) which corresponds to 64 Kbps, with each frame having 128 samples plus a prefix, in distribution networks having feed length variations of as much as two miles, it would still take less than approximately ten milliseconds to synchronize using a simple single sample advance/retard approach.

When a remotely initiated signal is determined to be in synch, then the central controller would send a return synchronization signal over the second overhead subchannel 34 indicating that no further phase shifting is required and that the remote unit may initiate full communications with the central modem incorporating the desired phase shifting. When the remote is synchronized before it is recognized by the central modem, the data tones transmitted just after initialization are used to identify the remote modem. It is expected that the relative phase shifting of frame boundaries is primarily dependent on fixed constraints such as the transmission length through the various feeds. Therefore, once a remote is synchronized, it does not need to be resynchronized unless the connection is terminated or broken.

It should be appreciated that when the central unit is not in communication with any other remote units at the time it receives a request to initiate communications, the central controller 60 would merely send back a synchronization signal indicating that no phase shifting was required and that full communications may begin. A similar signal would, of course, also be generated in the event that the requesting remote happens to be in synch with the other remote modems when it first attempts to initiate communications. When the remote modem receives such a signal, the same process may be followed with the required phase shift simply being zero.

Typically, the central controller 60 would also provide information indicative of the subchannels that the remote unit should utilize for its transmissions, etc. As mentioned above, the subchannel allocation can be dynamically changed during use. Although this feature is important to the discrete multi-tone transmission scheme is not particularly germane to the present invention and therefore will not be described only briefly, although it is described in detail in the cited references.

Figure 5:
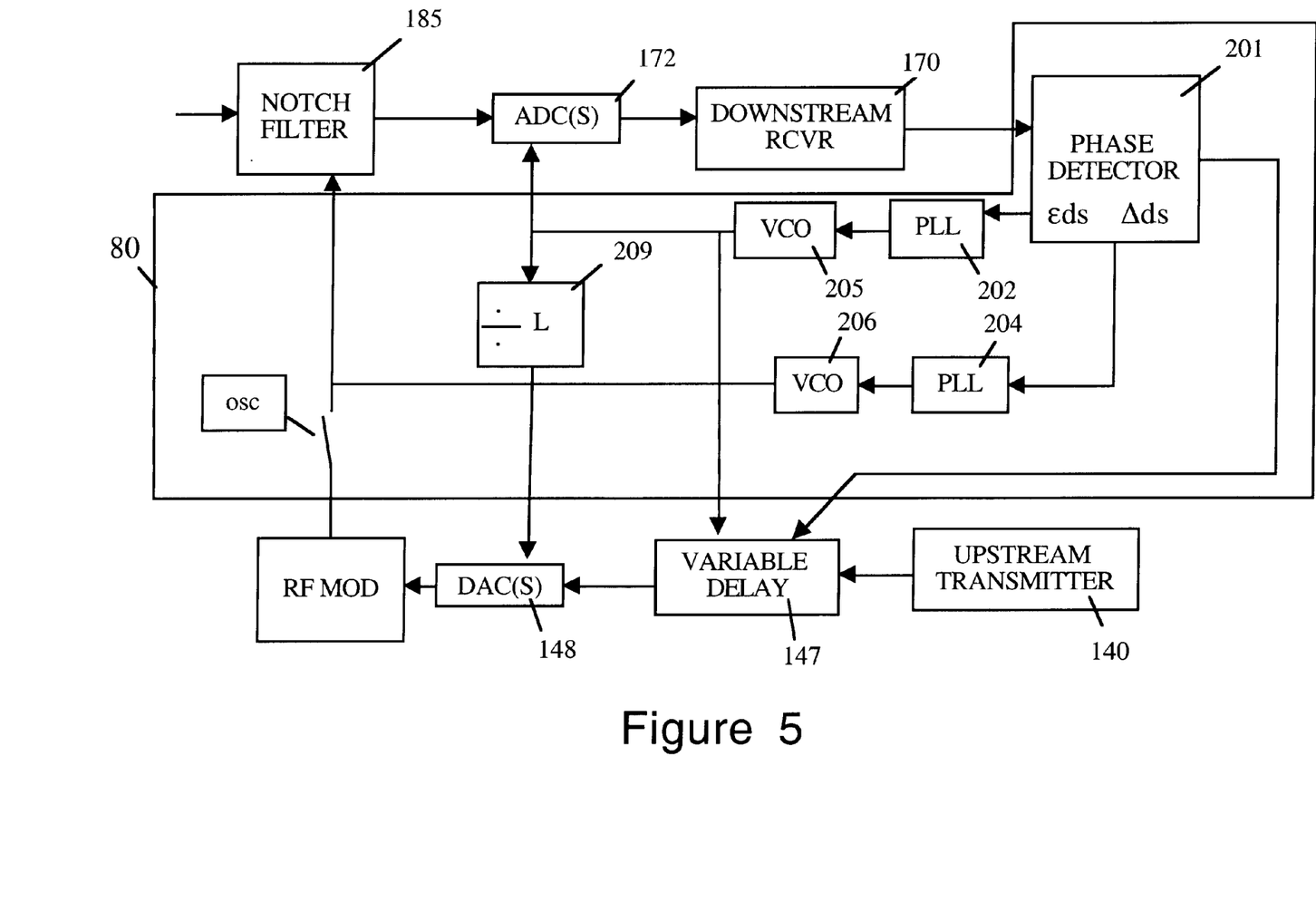
FIG. 5 is a block diagram illustrating a remote unit synchronization arrangement suitable for implementing synchronization and upstream symbol alignment.
Figure 6:
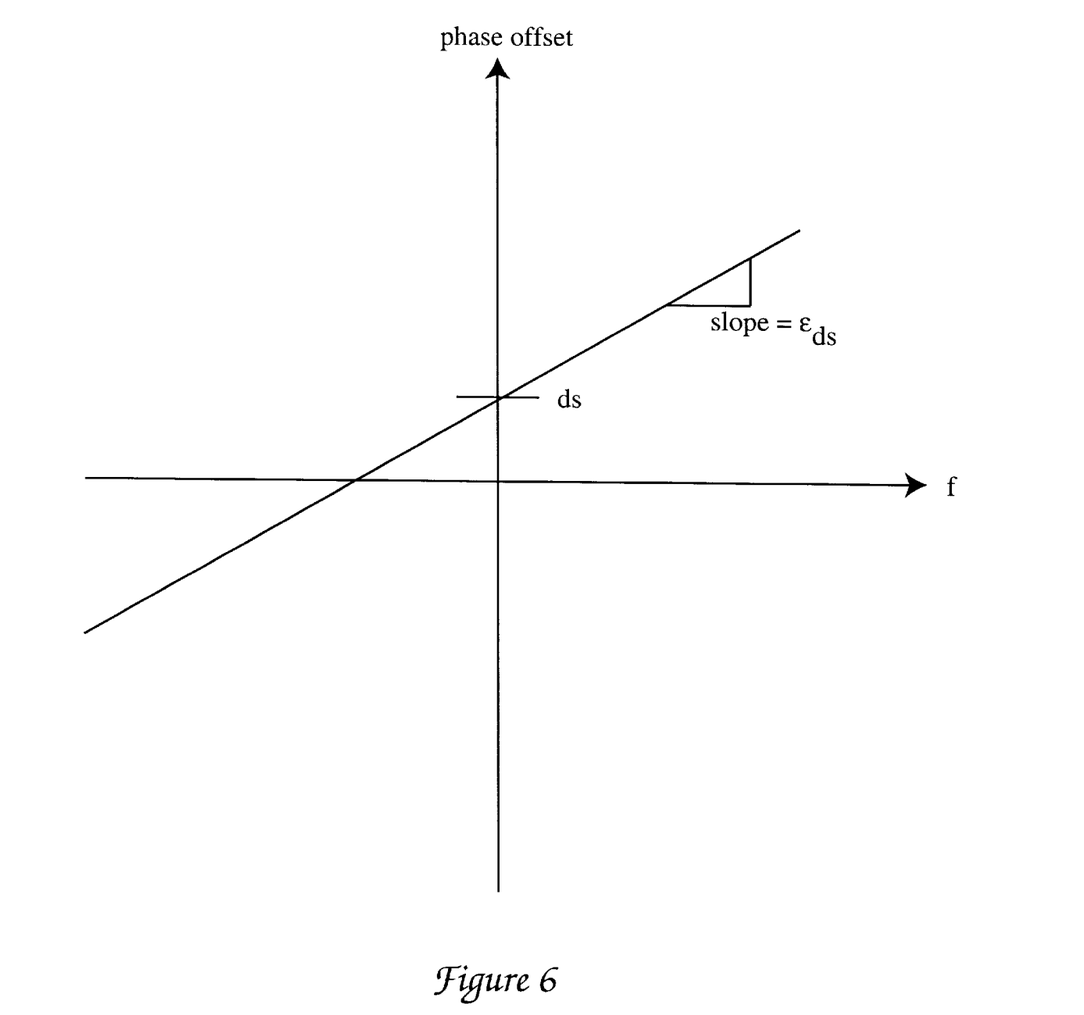
FIG. 6 is a graph illustrating phase error versus frequency. The slope is proportional to the timing error and the y-intercept is proportional to phase error of the carrier.

Synchronization of a remote modem to the central modem requires the acquisition of the central modem's sampling clock and carrier. In one preferred embodiment, these clocks are recovered by inspecting the phase errors for at least two tones. The phase error for these tones can be computed with respect to a fixed known transmitted phase on the tones (i.e. "pilot" tones). Alternatively, they may be determined by assuming decisions on the transmitted phases are correct and computing the offset between the pre- and post-decision phases (i.e., decision-aided phase-error computation). The slope of the phase error plot, as illustrated in FIG. 6, is proportional to the timing-phase error, while the constant part (the y-intercept) of the phase-error plot is the carrier-phase error. The timing (sampling) phase error and the carrier-phase error are determined by phase detector 201 and input to phase-lock loops 202, 204 that synthesize a sampling clock and carrier frequency at the recovered central modem frequencies as illustrated in FIG. 5. The carrier is used to demodulate the downstream signal to baseband and the sampling clock is (after division by divider 209) used to clock the analog-to-digital converter(s) (ADC). If the data tones and the signal tones occupy separated tones, then more than one analog-to-digital converter at slower sampling clocks may be used in place of a single higher-speed ADC clock. In embodiments that include the notch filter 185, voltage controlled oscillators 205, 206 are provided to control the location of the notch.

The same sampling clock (after division by divider 209) is used for upstream digital to analog converters. The upstream carrier may be synchronized to the downstream carrier or may not be so synchronized. When it is not synchronized, the central modem's upstream receiver will need to recover the upstream transmission carrier phase, otherwise the central modem's upstream receiver can use a rational phase-locked multiple of the downstream carrier for data recovery. Wideband remote modems would preferably use a sampling clock that is the same as the sampling clock in the central modem. These remote modems will not divide the recovered sampling clock. Narrow band remote modems that receive only a few tones will use a sample clock that is an integer divisor of the recovered sampling clock. Accordingly, narrow band remote modems can be less costly to implement.

The DMT symbols transmitted upstream from the remote modems must arrive at the central modem at the same time as discussed above, even when they are generated by different remote modems. Therefore, the delay synchronizer 147 inserts an integer number of sample-clocks delay into the upstream transmitted signals. This delay is programmed under control of the downstream synchronization signal as previously discussed. Again, it should be appreciated that the delay is based on the sample rate of the central modem, as opposed to the remote. Specifically, as illustrated in FIG. 5, the sample rate of the remote may be an integer factor of the sample rate of the central. However, the signals must be synchronized at the central modem and therefore, the synchronization adjustments must be made on the basis of the central modem's sample rate.

Figure 7:
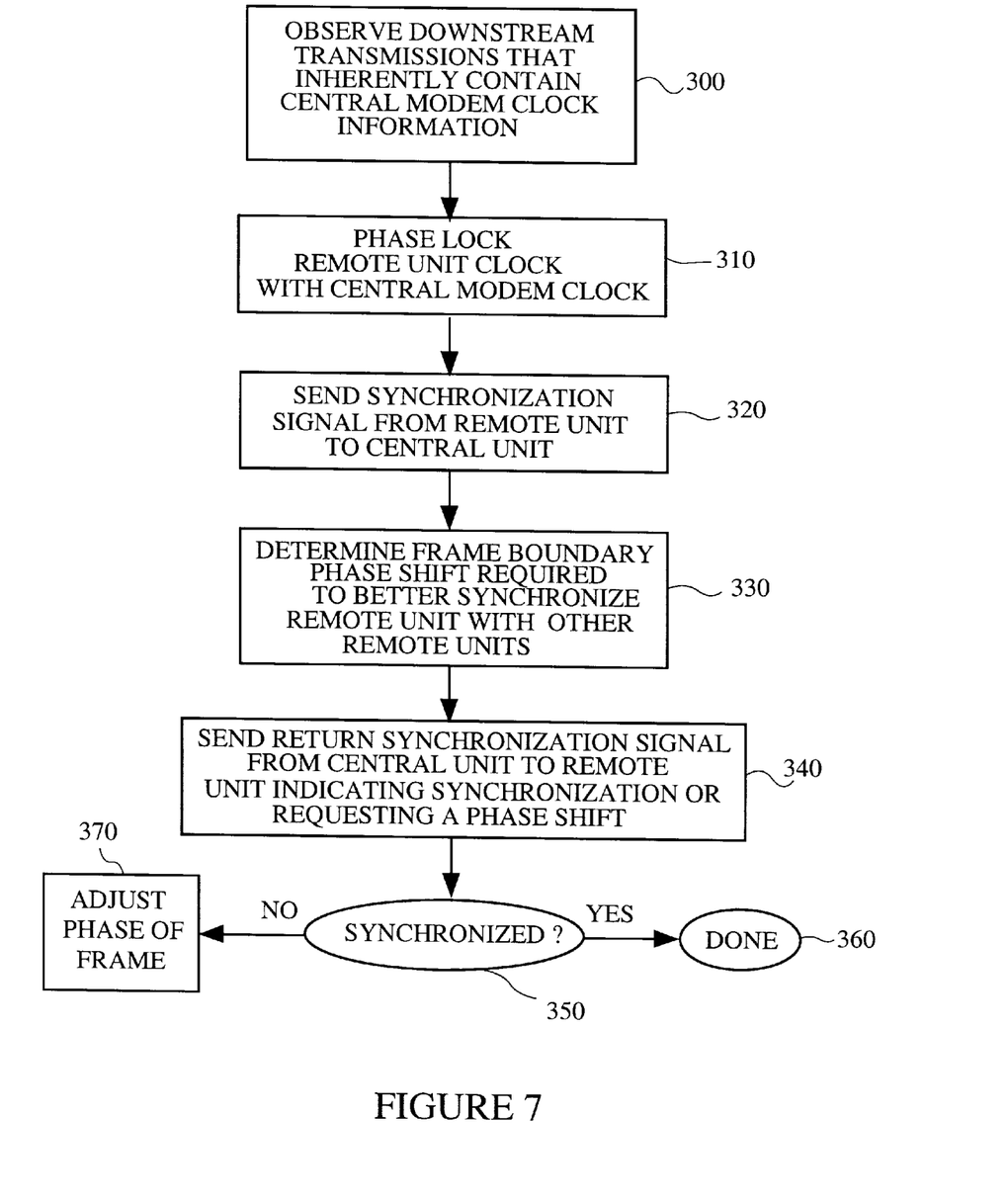
FIG. 7 is a flow chart illustrating the synchronization of a remote unit.

FIG. 7 shows the synchronization process in detail. In step 300, a remote unit observes a down stream transmission which inherently contains information about the central modem clock. The remote unit clock is then phase locked or "loop timed" to the central modem clock in step 310. Next, the remote unit sends a synchronization signal to the central unit in step 320. The central unit compares the frame boundary of the synchronization signal to any signals from other remote units and determines a phase shift to better synchronize the remote unit with the other remote units in step 330. The central unit then sends a return synchronization signal to the remote unit in step 340, either indicating that the remote unit is synchronized or requesting a phase shift. If the signal indicates synchronization, then step 350 transfers control to step 360 and the synchronization process is done. If a phase shift is requested, then the remote unit implements the phase shift and adjusts the phase of its frame boundary in step 370 and then returns to step 320. The process is repeated until the central unit sends a signal indicating that the remote unit is synchronized.

In the event that two remotes simultaneously attempt to initiate communications with the central modem, a conflict will occur and the central controller 60 will likely be confused by the upstream sychronization signals. In such a case, its downstream synchronization signal would indicate an improper phase shift and the confirmation synchronization signals would not be properly synchronized. In one embodiment, the central controller 60 could recognize the problem and instruct the remote units to stop and attempt to establish communications at a later point. In another embodiment, the central controller could simply send another downstream synchronization signal indicative of the additional phase shifting that is required. In either event, the remote unit will quickly recognize that a problem exists and assume that a conflict is occurring. In this situation, a suitable conflict resolution scheme can be employed. One simple conflict resolution scheme is simply to have each remote delay for a random amount of time and attempt to reinitiate communications after the random delay. As long as the delay is determined in a manner that the remotes are not likely to consistently follow the same delay pattern, their requests will eventually be separated sufficiently such that each can be brought on line independently. A variety of wait-time distributions may be utilized. By way of example, a Poisson distribution has been found to work well.

It should be appreciated that the described IFFT modulation scheme works extremely well for systems that are arranged to transmit relatively large chunks of data and therefore require more than a handful of tones. However, in many situations, the remotes may not need to transmit large blocks of data regularly. In such situations, it may be cost effective to utilize a simpler conventional modulation scheme for transmitting information from the remotes to the central unit. In such circumstances, the remote transmitter and the central receiver would both be replaced with the appropriate components. However, there would still be a need to synchronize the remotes as discussed above.

In operation, the central modem transmits an aggregate DMT signal that uses all (or the usable) tones in a manner such that each remote knows the tones that it is to receive and the number of bits allocated on each of its received tones. The remotes modems, in turn each use only a subset of the available upstream tones. The signals transmitted from the central modem to the remotes may be used to dynamically allocate the tones available to a particular receiver. Alternatively, in a static system, the allocation could be made in the downstream synchronization signal. Dynamic allocation can take place on either another dedicated overhead or control channel or may be multiplexed with other non-control signals. In the described system, the upstream signals are timed so that they arrive at the central modem at substantially the same time. Precise alignment is not necessary, however, the system works best when the boundaries are closely aligned in terms of the sample rate of the central modem.

Although only one embodiment of the present invention has been described in detail, it should be understood that the present invention may be embodied in many other specific forms without departing from the spirit or scope of the invention. For example, it should be appreciated that the overhead subchannels can be shared or distinct in each direction. The use of two sub-channels in the overhead bus has been described in most detail. However, it should be appreciated that a single sub-channel could be provided for both upstream and downstream communications (particularly if echo cancellation is used). Alternatively, more than two overhead sub-channels may be provided if the constraints of a particular system dictated that more than one sub-channel should be used for communications in either (or both) directions. For example, in a system having a relatively small number of remotes, each remote (or sub-group of remotes) could be assigned a dedicated sub-channel. The same could apply to downstream overhead communications. The drawback of using dedicated subchannels for each remote is, of course, that it is wasteful of bandwidth. Further, dedicated overhead sub-channels are described. However, it would be possible to multiplex other overhead information (such as control information) on the same sub-channel in some circumstances. In view of the foregoing, it should be apparent that the present examples are to be considered as illustrative and not restrictive, and the invention is not to be limited to the details given herein, but may be modified within the scope of the appended claims.

What is claimed is:

1. In a bi-directional data transmission system that facilitates communications between a central unit and a plurality of remote units using a frame based multi-carrier transmission scheme that has a multiplicity of discrete subchannels, a method of synchronizing frames transmitted from a selected first remote unit to the central unit, the method comprising the steps of:

(a) when the selected first remote unit desires to establish communications with the central unit, receiving a first signal from the central unit and coordinating a clock at the selected first remote unit with a clock signal carried in the first signal;

(b) transmitting a remote initiated synchronization signal from the selected first remote unit to the central unit over an overhead subchannel when the selected first remote unit desires to establish communications with the central unit;

(c) transmitting a centrally initiated synchronization signal from the central unit to the selected first remote unit when the central unit receives the remote initiated synchronization signal, wherein the centrally initiated synchronization signal contains information indicative of a frame boundary phase shift required to better synchronize the selected first remote unit with other remote units that are currently communicating with the central unit; and (d) shifting the phase of the frames outputted by the selected first remote unit in response to the centrally initiated synchronization signal to adjust the frame boundaries of the frames outputted by the selected first remote unit relative to the frame boundaries of frames output by the other remote units that are currently communicating with the central unit;

whereby the synchronization is arranged such that when fully synchronized, the frame boundaries from the various remotes will substantially coincide when they are received at the central unit.

2. A method as recited in claim 1 wherein the transmission scheme includes two dedicated overhead subchannels, and the remote initiated synchronization signal and the centrally initiated synchronization signal are transmitted over different overhead subchannels.

3. A method as recited in claim 1 wherein a single dedicated overhead subchannel is provided and the remote initiated synchronization signal and the centrally initiated synchronization signal are both transmitted over the single dedicated overhead subchannel.

4. A method as recited in claim 1 wherein the bi-directional data transmission system is an Asymmetric Digital Subscriber Line system that includes the transmission of signals over twisted pair telephone lines and wherein a modulator modulates encoded digital information onto subcarriers that correspond to subchannels that each have a bandwidth that is approximately 4.3125 kHz wide.

5. A method as recited in claim 1 wherein the bi-directional data transmission system is a cable system that includes the transmission of signals over a coaxial cable.

6. A method as recited in claim 1 wherein the bi-directional data transmission system is a digital cellular television system that includes the transmission of radio signals.

7. A method as recited in claim 2 wherein all of the remote units send their associated remote initiated synchronization signals over a single subchannel.

8. A method as recited in claim 1 wherein when two of the remote units transmit their associated remote initiated synchronization signals at substantially the same time, the remote units each resend an associated remote initiated synchronization signal.

9. A method as recited in claim 1 wherein the number of subchannels available to the selected remote unit for transmission of data to the central unit are dynamically allocated.

10. A method as recited in claim 1 wherein steps b, c and d are repeated until the selected remote unit is fully synchronized and further comprising the step of initiating normal communications from the selected remote unit to the central unit.

11. A discrete multi-carrier central modem unit for use in a bi-directional data transmission system that facilitates communications between the central modem unit and a plurality of remote modem units, the central modem unit comprising:
   an encoder for encoding digital information;
   a monitor for monitoring a communication line to determine line quality parameters indicative of noise levels at each of a multiplicity of subchannels, each subchannel corresponding in frequency to an associated subcarrier;
   a modulator for modulating the encoded digital information onto a multiplicity of subcarriers in a frame based multi-carrier signal, each subcarrier corresponding to an associated subchannel, the modulation being arranged to take into consideration at least the detected line quality parameters and a permissible power mask parameter, and wherein the modulator is capable of dynamically updating both the subchannels used and the amount of data transmitted on each subchannel during transmission in order to accommodate real time changes in specific parameters; and
   a synchronizer for monitoring signals received over a dedicated overhead subchannel, identifying a remote initiated synchronization signal that is received on the overhead subchannel, determining the phase shift between a frame boundary of the remote initiated synchronization signal and a frame boundary of a frame in said multi-carrier signal and generating a centrally initiated synchronization signal for transmission to the remote modem units that is indicative of a frame boundary phase shift required to synchronize a selected remote modem that initiated the remote initiated synchronization signal with other remote units that are currently communicating with the central modem unit.

12. A multi-carrier remote modem unit for use in a bi-directional data transmission system that facilitates communications between a central modem unit and a plurality of said remote modem units, the remote modem unit comprising:
   a demodulator for demodulating a first multi-carrier signal indicative of a first set of digital information, the demodulator being arranged to receive modulation information as part of the multi-carrier signal, wherein the demodulator is capable of dynamic updating during reception in response to changed modulation information in order to accommodate real time changes in the modulation scheme, the demodulator being arranged to strip a cyclic prefix from the multi-carrier signal;
   a decoder for decoding the demodulated digital information in real time;
   an encoder for encoding a second set of digital information;
   a modulator for modulating the encoded second set of digital information onto a multiplicity of subcarriers in a second multi-carrier signal, each subcarrier in the second multi-carrier signal corresponding to an associated subchannel; and
   a synchronizer for generating a first synchronization signal that is applied to an overhead subcarrier when the multi-carrier remote modem desires to initiate communications to the central modem, receiving a second synchronization signal from the central modem that is indicative of a frame boundary phase shift required to synchronize the remote modem with other remote units that are currently communicating with the central modem unit, and shifting the phase of the second multi-carrier signal so that it is synchronized at the central modem with multi-carrier signals sent by said other remote units.

13. A remote modem unit as recited in claim 12 wherein the demodulator further includes a time domain equalizer.

14. A remote modem unit as recited in claim 12 wherein the demodulator and the decoder are part of a receiver, and the remote unit further comprises an analog notch filter arranged to filter the first multi-carrier signal before it is passed to the receiver to reduce the energy level of the signals handled by the receiver.

15. In a bi-directional data transmission system that facilitates communications between a central unit and a plurality of remote units using a frame based multi-carrier transmission scheme that has a multiplicity of discrete subchannels, a method of synchronizing frames transmitted from a selected remote unit to the central unit, the method comprising the steps of:
   when the selected first remote unit desires to establish communications with the central unit, receiving a first signal from the central unit and coordinating a clock at the selected first remote unit with a clock signal carried in the first signal;
   transmitting a remote initiated synchronization signal from the selected first remote unit to the central unit over a dedicated overhead subchannel;
   receiving a centrally initiated synchronization signal transmitted from the central unit in response to the remote initiated synchronization signal, wherein the centrally initiated synchronization signal contains information indicative of a frame boundary phase shift required to synchronize the selected first remote unit with other remote units that are currently communicating with the central unit; and
   shifting the phase of the frames outputted by the selected first remote unit in response to the centrally initiated synchronization signal to adjust the frame boundaries of the frames outputted by the selected first remote unit relative to the frame boundaries of frames output by the other remote units that are currently communicating with the central unit, the synchronization being arranged to occur such that the frame boundaries from the various remotes are arranged to substantially coincide when they are received at the central unit.

* * * * *